P. HANSON.
BUTTER MAKING MACHINE.
APPLICATION FILED SEPT. 8, 1913.
1,195,006.
Patented Aug. 15, 1916.
4 SHEETS—SHEET 3.
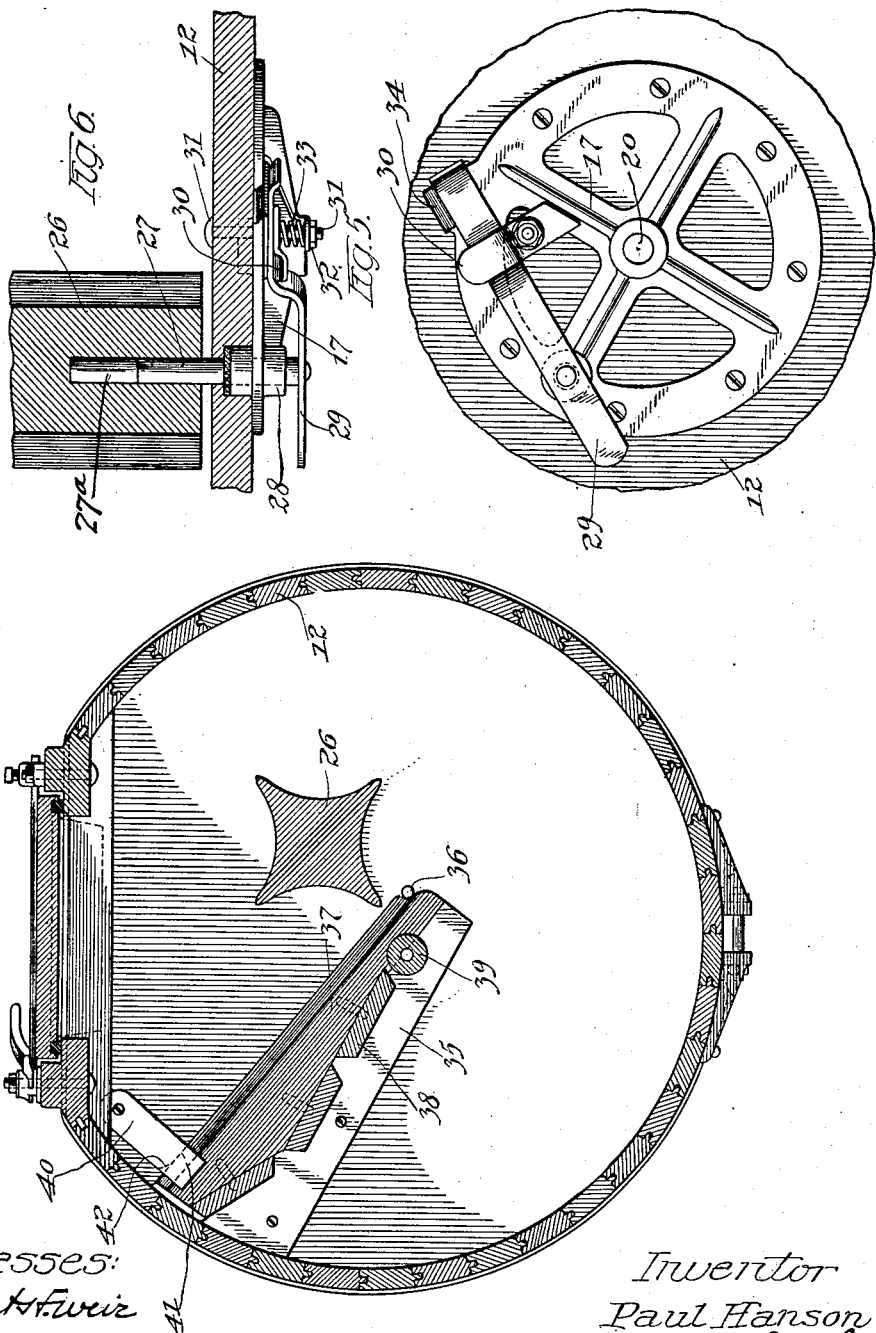

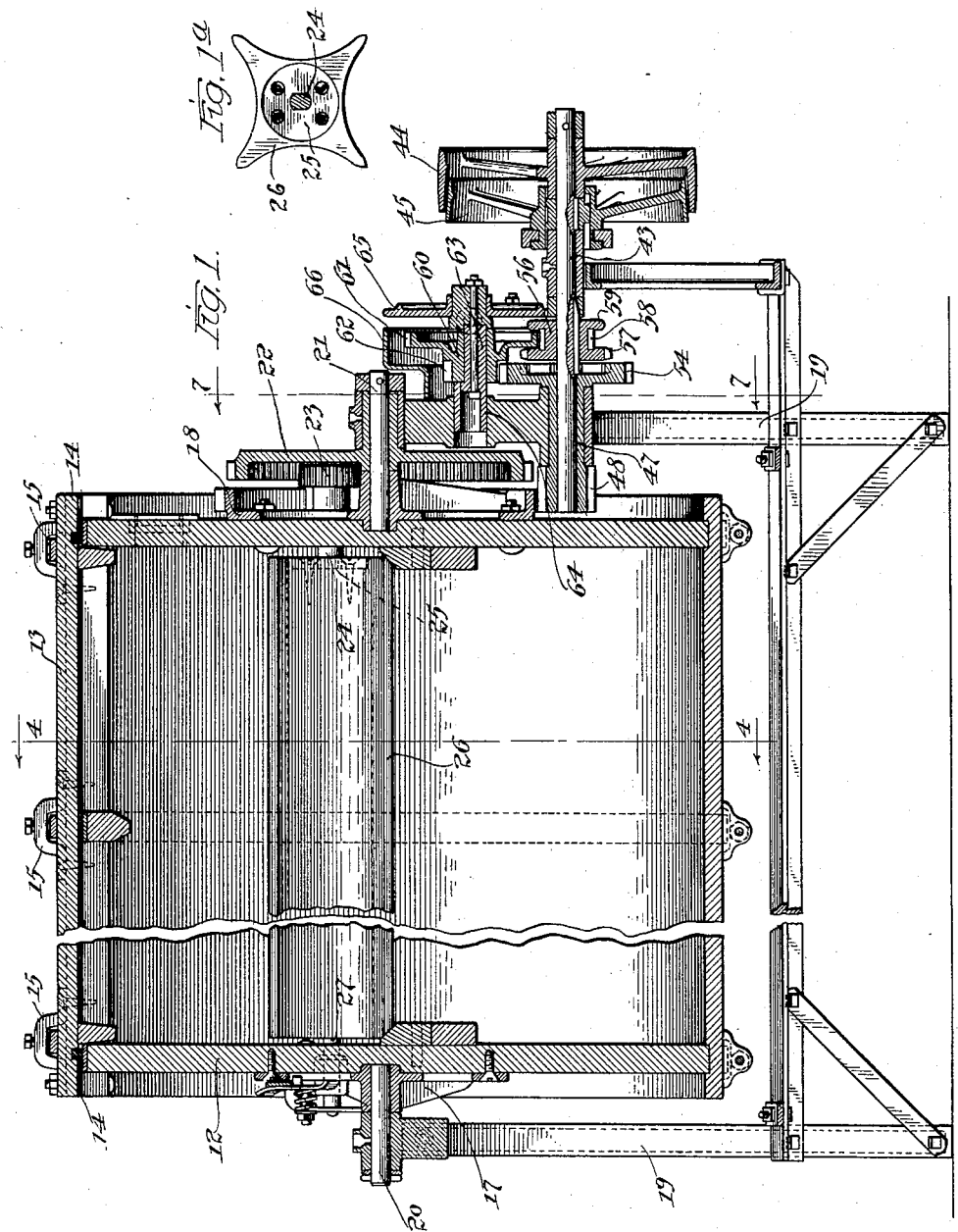

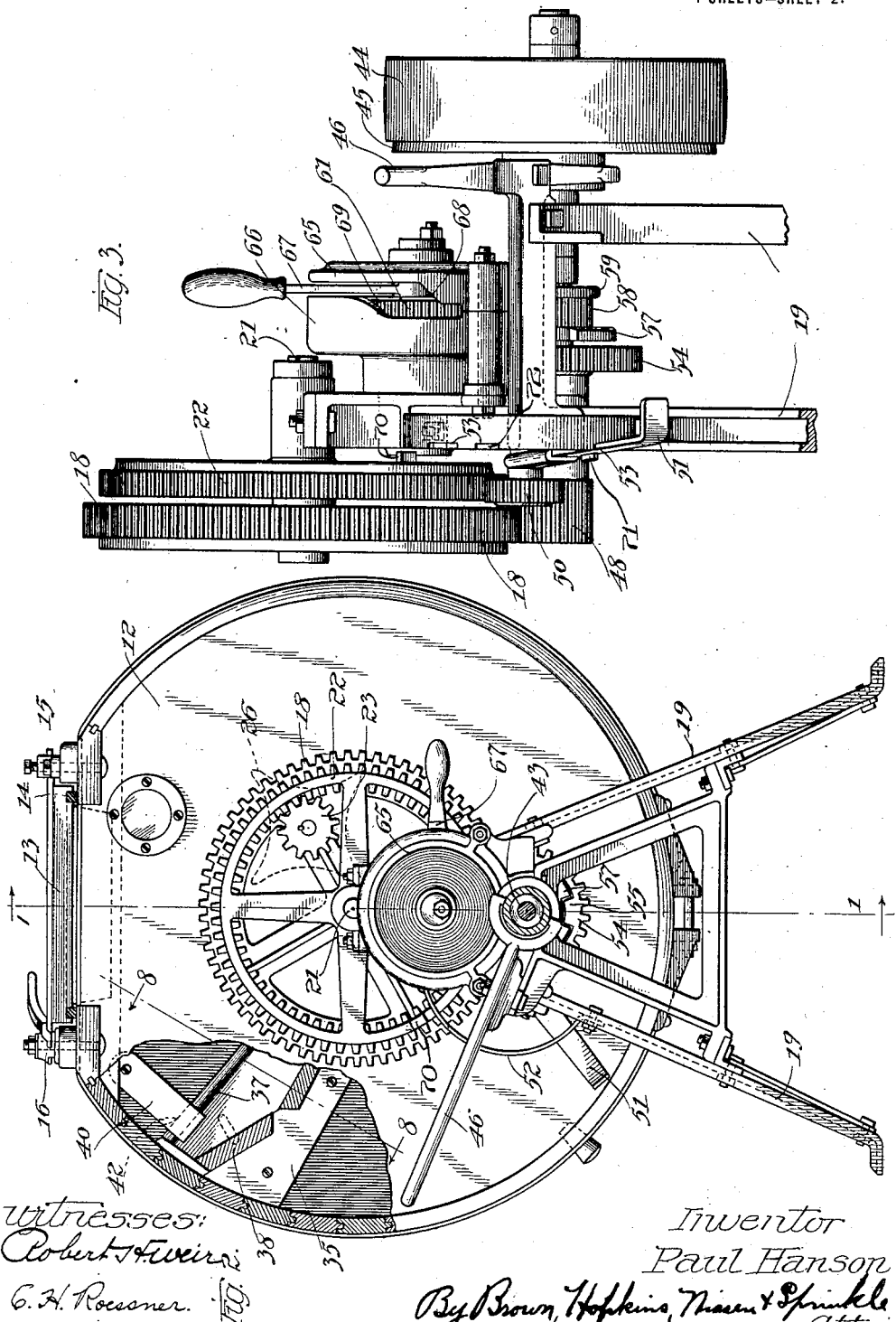

P. HANSON.
BUTTER MAKING MACHINE.
APPLICATION FILED SEPT. 8, 1913.
1,195,006.
Patented Aug. 15, 1916.
4 SHEETS—SHEET 4.
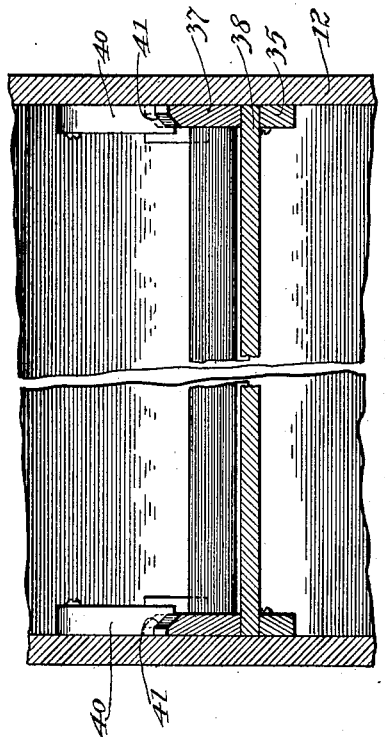
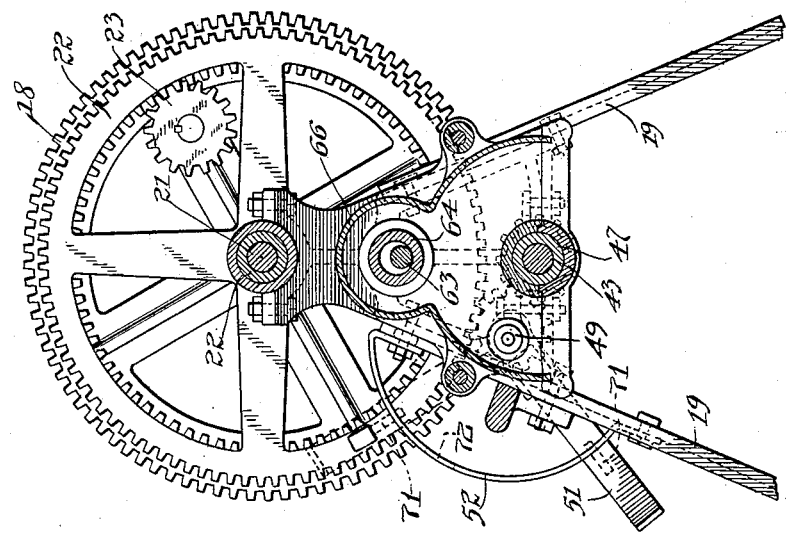
Witnesses:
Robert H. Weir
C. H. Roesner.
Inventor
Paul Hanson
By Brown, Hopkins, Niesen & Sprinkel
Attys.

UNITED STATES PATENT OFFICE.

PAUL HANSON, OF WILD HORSE, COLORADO.

BUTTER-MAKING MACHINE.

1,195,006.   Specification of Letters Patent.   Patented Aug. 15, 1916.

Application filed September 8, 1913. Serial No. 788,576.

*To all whom it may concern:*

Be it known that I, PAUL HANSON, a citizen of the United States, residing at Wild Horse, in the county of Cheyenne and State of Colorado, have invented certain new and useful Improvements in Butter-Making Machines, of which the following is a specification.

This invention relates to machines for churning and working butter, and the principal object is to provide a machine of this class in which the butter working roller may be easily removed from the butter working receptacle, and when in operation may be rotated with the receptacle or independently in the reverse direction, the machine being provided with mechanism whereby it may be rotated at fast or slow speed for churning and working the butter respectively.

The invention consists in the features of novelty in the construction, combination and arrangement of the several parts generally shown in the accompanying drawings and described in the specification, but more particularly pointed out in the appended claims.

In the drawings, Figure 1 is a sectional view taken on the line 1—1 of Fig. 2, illustrating an embodiment of my invention; Fig. 1ª is a detail view showing a reversible connection for the butter working rollers at one end; Fig. 2 is an end view with parts broken away to show the mounting of the butter working shelf; Fig. 3 is a side elevation of the operating mechanism for the machine; Fig. 4 is a sectional view on the line 4—4 of Fig. 1; Fig. 5 is a view of the bearing pin locking device; Fig. 6 is another view of the same showing a portion of the receptacle and of the butter working roller in section; Fig. 7 is a view on the line 7—7 of Fig. 1; Fig. 8 is a sectional view of the butter working shelf taken on the line 8—8 of Fig. 2; Fig. 9 is a detail view of the eccentrically pivot gear for connecting the driving gear with the butter working roller driving gear, and Fig. 10 is another view of the same.

In butter making machines it is customary to rotate the receptacle one speed for churning the cream and at another speed in working the butter. For working the butter a butter working roller is provided which is rotated independently in a direction opposite to the direction of rotation of the receptacle, and at the same time rotating with the receptacle to force the butter against a butter working shelf located in close proximity thereto. To change the speed of rotation of the receptacle and to throw the butter working roller into and out of rotating connection, suitable mechanism must be provided, and it is desirable that the same driving means be employed, the speed of rotation being produced in a simple manner by the suitable driving mechanism.

In the present exemplification of the invention a receptacle 12 is provided with a flat door opening extending the full length of the receptacle with binding hoops extending around the receptacle and across the flat door opening. A door 13 is provided which has packing material 14 about its edges to form a fluid-tight connection with the door opening and fastening devices 15 and 16 to maintain the door releasably in closed position.

The receptacle is mounted at the ends for horizontal rotation by means of a bearing spider 17 at one end and an externally toothed bearing spider 18 secured to the other end. To support the receptacle a frame designated generally by the reference numeral 19 is provided having standards at each end, one of the bearing standards being provided with a bearing pin 20 which extends into the hub of the bearing spider 17 at one end of the receptacle. The bearing standard at the other end is provided with a bearing shaft 21 which extends into the hub of the bearing spider 18, and freely mounted upon the shaft 21 is an internally and externally toothed member 22, the hub of which forms a bearing in the bearing standard at this end for the bearing shaft 21.

Meshing with the internal teeth of the member 22 is a roller driving gear 23 which has an engaging extremity 24 extending within the receptacle and adapted to be seated in a correspondingly perforated bearing plate 25 mounted in the end of a butter working roller 26. The other end of the butter working roller is supported by means of a releasable bearing pin 27 (see Figs. 1 and 6) which extends through the end of the receptacle into the end of the roller against a hardwood bearing block 27ª (see also Figs. 5 and 6) and through a hub-shaped portion 28 of the bearing spider 17, packing being interposed to form a fluid-tight joint.

The outer end of the bearing pin 27 is connected to a spring strip 29 which is preferably offset adjacent its free end and is adapted to be engaged by a spring clip 30. This spring clip is secured in position by means of a bolt 31 extending through the receptacle and having a nut 32 threaded on its outer end. The bolt passes through a perforation in the spring clip 30 and interposed between the nut and the spring clip is a coil spring 33 to hold the clip firmly in position. The spider 17 is preferably formed with an inclined surface 34 so that when the spring strip 29 is pressed downwardly it will enter between the clip 30 and the spider and will be retained in position by the clip. With this construction the butter working roller is readily removable from the receptacle by simply releasing the spring strip 29 from the clip 30 and withdrawing the bearing pin 27.

At the ends inside of the receptacle are shelf brackets 35 and pins 36 adjacent the inner ends of the brackets. A butter working shelf is supported by the bracket, each shelf comprising end pieces 37, slats 38 spaced apart and secured to the end pieces, and a roller 39. The end pieces are adapted to be inserted under the pins 36 and against the shelf brackets, the upper edges of the end pieces 37 being beveled, as shown more clearly in Figs. 4 and 8, and to hold the shelf in position a latch 40 is pivoted to the receptacle adjacent the outside thereof and adjacent one side of the door opening so that ready access may be had thereto. These latches are also preferably formed with a corresponding beveled portion 41 which engages the upper edge of the side pieces of the shelf, the forward edge of the beveled portion being rounded so that the latch may be readily rotated to engaging position. With this construction it will be evident that the entire shelf may be bodily removed from the receptacle by simply releasing the latches and lifting the shelf upwardly at its outer end.

Supported by the frame is a driving shaft 43 (see Figs. 2 and 3) provided at its outer end with a freely mounted driving pulley 44, a clutch 45 and a clutch operating lever 46. At the other end of the driving shaft is a driving member 47 comprising a toothed portion 48 with teeth of considerable length which mesh with the teeth of the driving member 18 secured to the receptacle 12. This driving member 47 is freely rotated about the shaft and preferably forms a bearing for the shaft at this end. Mounted in the frame adjacent the toothed portion 48 upon an eccentric pivot pin 49 (see Figs. 7, 9 and 10) is a gear 50 which is adapted to mesh both with the toothed portion 48 of the driving member 47 and with the external teeth of the butter working roller driving member 22. An arm 51 is adapted to rotate the gear 50 upon the pivot pin 49 into and out of its driving engagement, the position of the arm and the gear when out of driving engagement being indicated by the dotted outline in Fig. 9. In order to hold the arm 51 in these positions a circular segment 52 is secured to the frame which is provided with notches 53 along one edge in which the arm 51 engages.

The driving member 47 is also formed with an externally toothed portion 54 adjacent its other end and an internally toothed portion 55 opening from the end. Keyed to the shaft 43 and slidable longitudinally thereof is a gear member 56 having a toothed portion 57 adapted to engage with the internal teeth 55 of the gear member 47. This gear member 56 is also provided with a toothed portion 58 adjacent to and of less diameter than the other toothed portion and with a flange 59 on the other side. A double geared member 60 is provided with toothed portions 61 and 62 adapted to mesh respectively with the toothed portion 58 of the gear member 56 and the toothed portion 54 of the gear member 47. This gear member 60 is mounted on an eccentric portion 63 of a rotatable and longitudinally movable pivot pin 64 supported at one end by the frame and at the other end by a guard 65 mounted on the frame. Also mounted on the frame is a guard 66 which extends over the gear member 60 and forms a slot between itself and the guard plate 65. An arm 67 is secured to the pivot pin 64 and extends outwardly through the slot formed between the guard 65 and 66. By rotating this arm the gear member 60 is moved by the eccentric portion 63 out of engagement with the toothed portions 58 and 54. The eccentricity is not sufficient, however, to move the toothed portion 61 of the gear member 60 sufficiently to clear the toothed portion 57 and the flange 59 of the member 56. By moving the member 60 longitudinally, therefore, the toothed portion 57 of the member 56 can be moved into engagement with the internally toothed portion 55 of the gear member 47. The guard 65, therefore, is provided with an inclined face 68 (see Fig. 3), and the guard 66 is formed with a corresponding recess and inclined face 69 whereby the arm 67 may be rotated in one direction and then moved longitudinally of its axis by contact with the inclined portion 68, whereupon the gear member 60 will cause the gear member 56 to be moved into direct engagement with the gear member 47. The reverse movement of the arm 67 will, of course, move the gear member 56 out of such engagement and cause the toothed portions of the gear member 60 to engage with the corresponding toothed portions of the other driving members. With this mechanism the receptacle 12 can be driven at slow speed through the gear members 56, 60 and 47, or can be driven at high speed by directly engaging the gear member 56 with the gear member 47. In either case the butter working roller may be rotated in the reverse direction by throwing the gear 50 into or out of operative connection.

In order to rotate the butter working roller at the same time that the receptacle 12 is rotated, and in the reverse direction, a stop 70 (see Fig. 3) is located on the member 22 which is adapted to be engaged by a coöperating lug 71 on the arm 51. The segment 52 is preferably provided with an intermediate notch 72 similar to the notches 53, in which the arm 51 engages, and when the arm is in the intermediate position the gear 50 controlled thereby is out of toothed engagement with the member 22. When the driving member 47 is rotated at slow speed the engagement of the lug 71 with the stop 70 will cause the gear 23 to work around the internal teeth of the toothed member 22 to rotate the roller 26 in the reverse direction. When the driving member 47 is rotated at fast speed the butter working roller will be rotated in reverse direction at correspondingly fast speed.

What I claim is:

1. A butter making machine comprising a rotatable receptacle, an externally toothed bearing spider at one end, an internally and externally toothed member, a butter working roller, a gear connected to the butter working roller and in engagement with the internal teeth of said member, and means to drive the bearing spider and the said member simultaneously in opposite directions.

2. A butter making machine comprising a rotatable receptacle, an externally toothed bearing spider at one end, an internally and externally toothed member, a butter working roller, a gear connected to the butter working roller and in engagement with the internal teeth of said member, a driving gear in engagement with said bearing spider having teeth of greater width than the teeth of the spider, and a second gear to form driving engagement between the first named gear and the external teeth of said member.

3. A butter making machine comprising a rotatable receptacle, an externally toothed bearing spider at one end, an internally and externally toothed member, a butter working roller, a gear connected to the butter working roller and in engagement with the internal teeth of said member, a driving gear in engagement with said bearing spider having teeth of greater width than the teeth of the spider, and an eccentrically mounted gear movable into and out of driving engagement with the first named gear and the external teeth of the said member.

In testimony whereof I have signed my name to this specification, in the presence of two subscribing witnesses, on this 2nd day of September A. D. 1913.

PAUL HANSON.

Witnesses:
CARL K. BENNETT,
JESSIE D. LUND.

Copies of this patent may be obtained for five cents each, by addressing the "Commissioner of Patents, Washington, D. C."